United States Patent [19]

Carlson

[11] 3,948,361
[45] Apr. 6, 1976

[54] PARKING BRAKE MECHANISM
[75] Inventor: John A. Carlson, Wichita, Kans.
[73] Assignee: Arctic Enterprises, Inc., Thief River Falls, Minn.
[22] Filed: July 24, 1974
[21] Appl. No.: 491,292

[52] U.S. Cl. .................... 188/24; 74/489; 74/538; 74/541; 188/265
[51] Int. Cl.² ........................................ B62L 3/06
[58] Field of Search ............ 74/533, 534, 535, 537, 74/538, 488, 489, 541; 188/2 D, 24, 26, 265

[56] References Cited
UNITED STATES PATENTS

| 735,113 | 8/1903 | Kelland et al. | 188/24 |
| 2,472,442 | 6/1949 | Schueler | 74/541 |

FOREIGN PATENTS OR APPLICATIONS

| 557,949 | 8/1923 | France | 188/24 |
| 923,830 | 7/1947 | France | 188/24 |
| 359,610 | 3/1906 | France | 188/24 |
| 93,951 | 4/1922 | Italy | 188/24 |
| 854,374 | 4/1940 | France | 188/24 |

Primary Examiner—Trygve M. Blix
Assistant Examiner—Edward R. Kazenske
Attorney, Agent, or Firm—Allegretti, Newitt, Witcoff & McAndrews

[57] ABSTRACT

A parking brake mechanism for use on vehicles of the type normally using a hand-actuated brake, such as snowmobiles, motorcycles, bicycles and the like. Normally, the hand actuated brake is mounted on a handle bar assembly of the vehicle. The brake includes a lever adjacent a hand grip portion and is pivotally mounted thereon. The brake lever, when manually operated, moves from a brake disengaged position to a brake engaged position. The brake lever is normally biased to a brake disengaged position. A brake cable is normally operatively connected to the brake lever, at one of its ends, and at its other end, is operatively connected to a brake, the lever moving the cable from a brake disengaged position to a brake engaged position. The parking brake mechanism includes a U-shaped actuator member, straddling the hand grip portion, and is movably carried thereon. The actuator member is movable between a first position, when the parking brake mechanism is disengaged, and a second position when the parking brake mechanism is engaged. Cooperating locking elements are provided on the lever and on the actuator member for locking the lever in a locked condition, only when the actuator member is in the second position and only when the brake lever and cable are in the brake engaged position.

11 Claims, 5 Drawing Figures

U.S. Patent   April 6, 1976   3,948,361
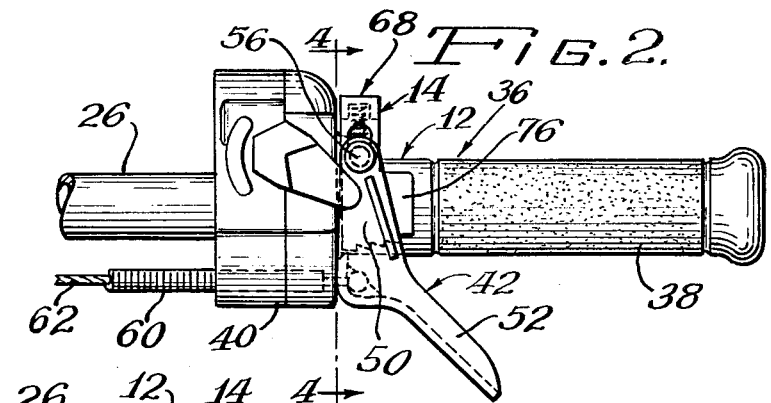
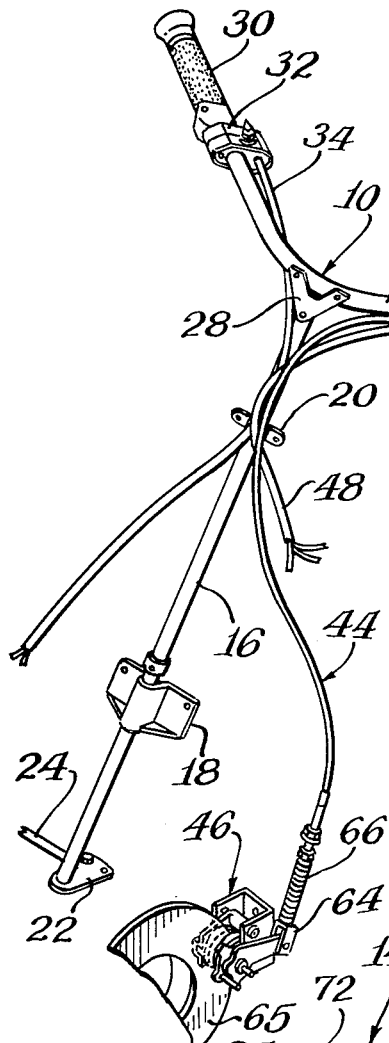
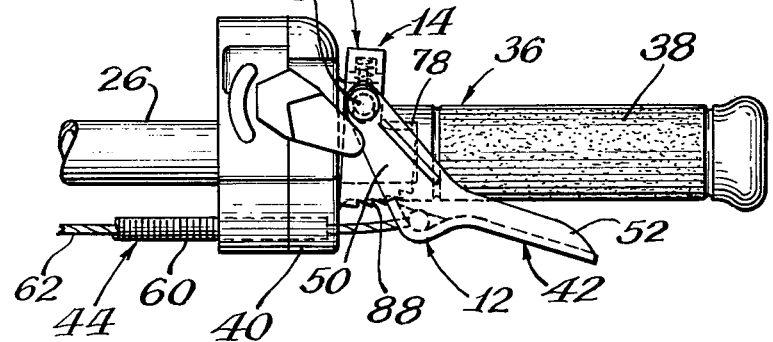
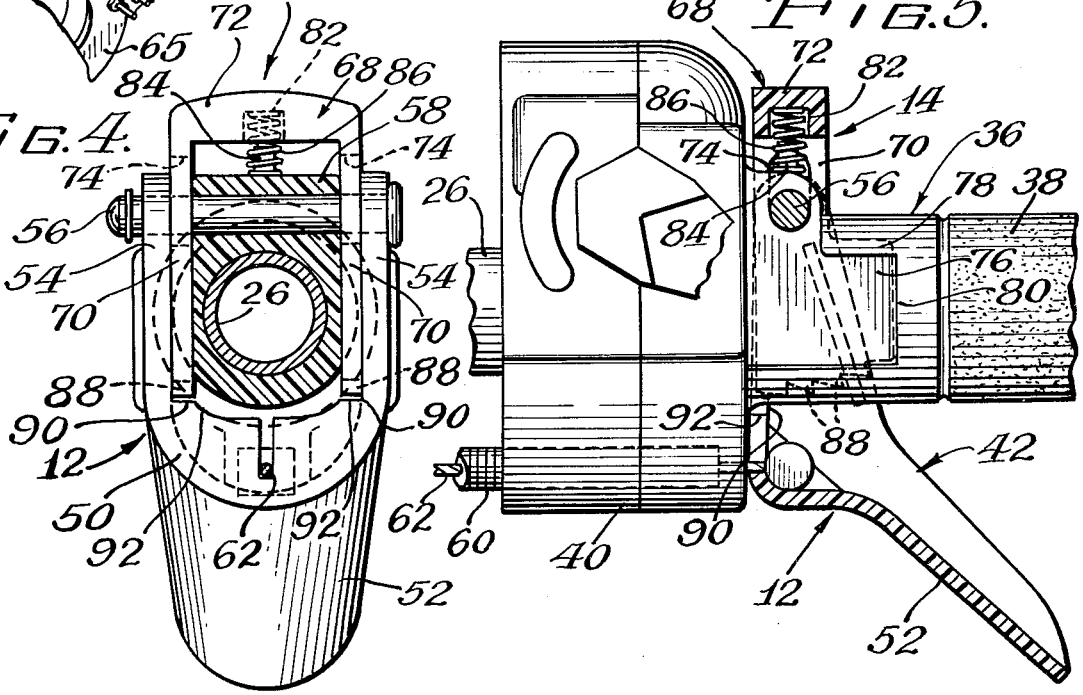

PARKING BRAKE MECHANISM

BACKGROUND OF THE INVENTION

This invention relates to a parking brake mechanism useful with a conventional brake of a vehicle, such as a snowmobile, motorcycle, bicycle, and the like, normally having a hand brake mounted on a handle bar assembly of the vehicle.

FIELD OF THE INVENTION AND DISCUSSION OF THE PRIOR ART

Generally, in two wheeled vehicles, conventionally steered by a handle bar assembly, as in motorcycles, snowmobiles, and the like, it is quite common to have a hand brake operatively mounted on the handle bar assembly in the area of at least one of the hand grips on the handle bar. Normally, such a hand brake comprises a lever which is pivotally mounted on the handle bar assembly in the area of at least one of the hand grips, so that the operator of the vechile can conveniently grasp and compress the brake lever toward the hand grip on the handle bar assembly in order to engage or operate the brake.

Normally, hand brakes on vehicles, such as snowmobiles, motorcycles, and bicycles, have not included a parking brake assembly, that is, an assembly that maintains a brake in a locked or engaged position when the vehicle is in the stopped condition, whether the engine is on or off, and whether the vehicle is attended or unattended by an operator.

Two basic reasons as to why such vehicles, as motorcycles or snowmobiles, have not used parking brakes are excessive costs and interference with normal service operation of the brake. Excessive manufacturing costs, of course, are a common problem with any item to be sold. Thus, the provision of a hand brake, when considered too expensive to manufacture, is not commercially feasible. Even more important, however, is the problem encountered if a parking brake interferes with normal operation of the normal brake. It is apparent that, if the addition of a parking brake will adversely interfere with normal service operation of the normal hand brake, this disadvantage would far outweigh any advantage that the parking brake would provide.

Although a parking brake mechanism, used with a hand brake, would be useful with motorcycles, motor bikes, bicycles, and the like, one important use of parking brakes is with snowmobiles. As with other such motorized vehicles, snowmobiles have, in general, not used a parking brake arrangement for the above-mentioned reasons, that is, excessive cost and interference with the normal operation of the hand brake.

Practically all snowmobiles being made today utilize automatic transmissions, such as variable speed drive clutches, using movable sheaves. Such automatic transmissions, have no neutral position. When the operator of the snowmobile starts the engine, the throttle is commonly applied in bursts so as to heat up the engine. Under such conditions, the advantage of having a parking brake mechanism combined with the normal braking system of the snowmobile is an important safety feature, for the operator, for persons in the area of the snowmobile, for the snowmobile itself, and for other near-by physical property. In essence, although snowmobiles have been constructed with the highest standards of safety, additional safety features, which meet other important design standards and considerations, are most welcome.

SUMMARY OF THE INVENTION

In view of the foregoing, it is an important object of this invention to provide a uniquely constructed parking brake mechanism, useful with two wheeled vehicles, using handle bar steering assemblies and incorporating manually operated hand grips.

It is also an object of this invention to provide a parking brake mechanism, particularly for motorized vehicles, such as snowmobiles and motorcycles, wherein the parking brake mechanism is characterized by its simplicity and economy of construction, manufacture and operation.

It is a further object of this invention to provide a uniquely constructed parking brake mechanism useful for attachment to vehicles, including snowmobiles and motorcylces, wherein the parking brake mechanism is operatively interconnected to a hand brake mechanism of the type commonly used with such vehicles, and yet the hand brake remains totally inoperative and does not interfere with the normal operation of a conventional hand brake of the vehicle.

Further purposes and objects of this invention will appear as the specification proceeds.

The foregoing objects are accomplished by providing a parking brake mechanism, particularly for motorized vehicles, of the type which use a handle bar steering assembly having a hand grip portion, a hand brake assembly being operatively mounted on the handle bar assembly, wherein the brake assembly is of a type which includes a manually operated brake lever which is pivotally carried by the hand grip portion, the brake lever being movable between a brake engaged position and a brake disengaged position, a brake cable operatively connected to the brake lever, the lever moving the brake cable from a brake disengaged position to a brake engaged position, a parking brake actuator member being operatively mounted on the hand grip portion, the actuator member being movable between a first position when the parking brake mechanism is disengaged and a second position when the parking brake mechanism is engaged, and cooperating means on the brake lever and on the actuator member for locking the lever in a locked condition, only when the actuator member is in the second position and only when the brake lever is in the brake engaged position.

BRIEF DESCRIPTION OF THE DRAWINGS

One particular embodiment of the present invention is illustrated in the accompanying drawings wherein:

FIG. 1 is a perspective view of handle bar assembly of the type commonly used on snowmobiles, having a hand brake mechanism and a parking brake mechanism operatively mounted thereon in cooperating relationship;

FIG. 2 is an enlarged side elevational view of a combination hand brake mechanism and parking brake mechanism at the handle portion of the assembly shown in FIG. 1, while the brake and parking brake are in the disengaged position;

FIG. 3 is a view similar to FIG. 2, but showing the brake mechanism and parking brake mechanism in the cooperating and engaged position;

FIG. 4 is a cross sectional view taken along the line 4—4 of FIG. 2; and

FIG. 5 is a further enlarged partially sectioned view, illustrating certain details of the parking brake mechanism shown in FIGS. 2 and 3.

DETAILED DESCRIPTION OF THE PREFERRED EMBODIMENT

Referring to FIG. 1, a handle bar assembly, generally 10, of the type normally used in steering a vehicle, particularly two wheeled motorized vehicles, such as snowmobiles and motorcycles (not shown) is shown in pictorial view. The handle bar assembly 10 has a hand brake mechanism, generally 12, operatively mounted thereon, the brake mechanism 12 including my uniquely constructed parking brake assembly, generally 14.

The handle bar assembly 10 is of a generally conventional construction, and includes a steering post or column 16 which is rotatably carried by a lower support bracket 18 and an upper support bracket 20. The brackets 18 and 20 are mounted on the chassis or frame (not shown) of the snowmobile or the like. In a conventional manner, the lower end of the steering post 16 includes an arm 22 which is pivotally interconnected to a tie rod 24 used for steering the snowmobile. The upper end of the steering column 16 has a handle bar 26 mounted thereon, preferably utilizing a reinforcing bracket 28 to assist in securing the center of the steering post to the handle bar 26.

In a conventional manner, the right hand grip 30 mounted on the handle bar 26 includes a throttle control for controlling the operating speed of the snowmobile. The throttle grip is mounted on the handle bar 26 by a mounting portion 32. A throttle cable 34 extends from the mounting portion 32, again, in a conventional manner.

The left hand grip assembly, generally 36, has the hand brake mechanism 12 and parking brake mechanism 14 operatively mounted thereon. Referring to FIGS. 2 and 3, the left hand grip 36 comprises a fixed tubular grip portion 38 having a flanged mounting portion 40 which fixedly secures the left hand grip assembly 36 to the outer end portion of the left hand side of the handle bar 26.

The hand brake mechanism 12 generally includes a brake operating lever 42, a brake cable, generally 44, and a brake, generally 46. Referring to FIG. 1, there is also shown an electrical cable assembly 48 which is interconnected to a switch for operating tail lights on the snowmobile, when the brake lever 42 and thereby the brake 46 is operated.

Referring to FIGS. 2 – 4, the brake lever 42 includes a U-shaped mounting portion 50 and an outwardly projecting handle portion 52 formed unitarily with the mounting portion 50. In the brake disengaged position, as seen in FIG. 2, the U-shaped mounting portion 50 is mounted in a position, which, in the brake disengaged position, is transverse to the longitudinal axis of the handle grip 38. Legs 54 of the U-shaped mounting portion 50 straddle the grip portion 38 and are pivotally mounted thereon by means of a transverse pivot pin 56 which passes through a mounting boss 58 on the flange mounting portion 40, thereby pivotally carrying the brake lever 42 for movement towards and away from the grip 38. In the brake disengaged position, the handle portion 52 is positioned at approximately 45° to the mounting portion 50 and extends in a direction outwardly from the gripping portion 38. The handle portion 52 has a length sufficient for a person to manually compress inwardly, with a hand, towards the grip portion 38 when it is desired to apply the brake 46.

The brake cable 44 includes flexible outer sheath 60 which is secured, at its upper end, to the flange mounting portion 40. A movable brake actuating cable 62 is carried within the sheath 60 and is interconnected at its lower end to a U-shaped bracket 64 which, in turn, is interconnected to the brake mechanism 46 for actuating the brake 46 when the brake lever 42 is applied, that is, as the lever 42 is compressed inwardly toward the gripping portion 38, the cable 62 is pulled relative to the sheath 60 thereby operating the brake assembly 46, in a conventional manner. The brake assembly is a conventional puck type brake wherein pucks, positioned on opposite sides of a disc 65 on a drive shaft (not shown), move towards and away from braking relationship with the disc 65 in response to movement of the brake cable 62.

A compression spring 66 is located between the U-shaped bracket 64, interconnected to the brake 46, and the lower end of the sheath or sheave 60 of the brake cable assembly 44. The compression spring 66 normally biases the lever 42, the actuator cable 62, and thereby the brake assembly 46 to the brake disengaged position. When the operator compresses the lever 42 from the position of FIG. 2, to that of FIG. 3, the spring 66 is compressed while at the same time, braking pressure is applied to the disc 65 by the brake 46. When the operator releases the brake lever 42, the compression spring 66 moves the actuator cable 62 and thereby the brake 46 is disengaged from the brake disc 65.

As to the brake construction 46, any conventional type of brake mechanism commonly used with motorcycles snowmobiles, and the like, may be used. In the drawings, a puck type brake is shown, although other types of brakes may be used.

The foregoing generally describes a conventional hand brake mechanism. In the past, hand brakes, of the described type, generally did not utilize parking brake mechanisms, because of excessive cost and/or because the parking brake mechanism would actually interfere with the normal operation of the snowmobile, an undesirable condition possibly raising safety hazards. My parking brake mechanism 14, to be hereinafter described is highly economical and only a few new parts are required. The parking brake mechanism 14 is constructed and designed so as to be used in combination with a conventional hand brake mechanism, while avoiding any possibility of significant or dangerous interference with the operation of the hand brake 12.

The parking brake mechanism 14 includes an actuator member, generally 68. The actuator, as seen best in FIG. 4, is U-shaped, and includes a pair of spaced legs 70 interconnected by a base portion 72. The actuator member 68 straddles the gripping portion 38 of the left hand grip 36, in a direction opposite the straddling position of the legs 54 of the brake lever 42.

Each actuator leg 70 is positioned between one of the legs 54 of the brake lever 42 and the hand grip portion 38. The legs 70 of the actuator 68 includes longitudinal slots 74 which are slidably received by the pivot pin 56 for the brake lever 42.

As seen in FIGS. 2, 3, and 5, one lateral edge of the actuator 68 is positioned in close sliding proximity to the flanged portion 40 adjacent the hand grip 38. The opposite edge of the actuator 68, which faces toward the gripping portion 38, includes a rearward projection 76 in the plane of each leg 70, at the lower portion thereof. The projections 76 are each slidably received by a recess portion 78 on each side of the gripping portion 38. Particularly referring to FIGS. 4 and 5, the actuator 68 is maintained in a guided sliding position, in confined relationship in a transverse direction, between the legs 54 of the brake lever 42 and the hand grip portion 38, while the actuator member 68 is also slidably confined in the longitudinal direction by the flange mounting portion 40 and by the edges 80 defined on the recesses 78. At the same time, the slots 74 maintain the actuator member 68 in a confined position relative to the brake lever 42.

As seen best in FIG. 5, a well 82 is located in the central, inner portion of the base 72 of the actuator 68. A pin 84, integral with the boss 58, projects centrally thereof, and in alignment with the well 82. A compression spring 86 is received around the pin 84 and in the well 82 to normally bias the actuator member 68 into a parking brake disengaged position.

The outwardly facing edges of the legs 70 and continuous projections 76 of the actuator 68 include a plurality of sets of teeth 88. A plurality of sets of such teeth 88 are used in order to make sure that the hand brake mechanism is operative even after the discs or pucks in the brake 46 begin to wear down. For this reason, a first set of teeth 88 on the actuator 68 is positioned in close proximity to the mounting flange portion 40 while the outer set of teeth 88, as shown in the engaged position in FIG. 3, are provided in order to assure holding of the parking brake 14 and thereby the hand brake 12, after the discs or pucks on the brake 46 begin to wear down from use.

As seen best in FIG. 4, the teeth 88 engage the ledges 92 of recesses 90. The recesses 90 are defined in the inner periphery of the mounting portion 50 of the brake lever 42 and are in close proximity to the intersection of the legs 54 of the lever 42 with the base portion of the U-shaped mounting portion 50.

As seen in the drawings, the hand brake mechanism 12 cooperates with components of the parking brake 14 for engaging the brake when the snowmobile (or other such vehicle) is in a stopped position. It is merely necessary for the operator to compress the actuator 68 inwardly in opposition to the spring 86, while at the same time, the brake lever 42 is compressed inwardly so that one set of teeth 88 engage the ledges 92 of the recesses 90.

When the lever 42 is so compressed, the brake 46 is also engaged. Since the teeth 88 engage the ledges 92, the actuator 68 holds the lever in the brake engaged position, thereby serving the function of a parking brake when the vehicle is stopped.

It is possible to operate the parking brake 14 only in combination with the hand brake mechanism 12. Both the parking brake actuator 68 and the brake lever 42 act in opposition to the springs 86 and 66 in order to engage the parking brake 14 when the teeth 88 lock the lever 42 in a brake engaged position. In order to release the hand brake 12, and the parking brake 14, it is merely necessary for the operator to compress the lever 42 slightly, so as to disengage the recesses 90 from the teeth 88 and cause the spring 86 to move the actuator member 68 back to the disengaged position.

It is apparent that the parking brake 14 not only does not interfere with normal operation of the hand brake 12, but is used in combination with a conventional hand brake mechanism 12, in order to accomplish the desired results, that is, lack of interference with normal operation of the hand braking mechanism 12 and economy of construction for the parking brake. Since only two additional parts, that is, the actuator member 68 and the compression spring 86, are required, the cost of the addition of a parking brake 14 is minimal.

While in the foregoing, I have provided a detailed description of one embodiment of my invention, it is to be understood that all equivalents obvious to those having skill in the art are to be included within the scope of the invention as claimed.

What I claim and desire to secure by Letters Patent is:

1. A combined parking brake and brake mechanism for a vehicle of the type utilizing a handle bar assembly which includes a hand grip portion, a brake assembly operatively mounted on said handle bar assembly, said brake assembly being of the type which includes a movable brake lever pivotally carried by said handle bar assembly adjacent said hand grip portion useful in normal braking for said vehicle, said lever being movable between a brake engaged position, and a brake disengaged position while being normally urged to a brake disengaged position, said parking brake mechanism comprising, in combination, a pin member mounted on said handle bar assembly adjacent said hand grip portion, said brake lever being pivotally carried by said pin member, an actuator member mounted on said handle bar assembly adjacent said hand grip portion, and being slidably carried by said pin member, said actuator member being movable between a first position, when said parking brake mechanism is disengaged, and a second position, when said parking brake mechanism is engaged, means for normally biasing said actuator member to the disengaged position for avoiding interference with the normal operation of said brake lever, and cooperating means on said lever and on said actuator member for locking said lever in said brake engaged position, only when said actuator member is in second position and while opposing the normal biasing of said actuator member to said disengaged position and when said lever is in said brake engaged position.

2. The mechanism of claim 1 wherein said actuator member is U-shaped and includes a pair of spaced legs having slots therein for receiving said pin member.

3. The mechanism of claim 1 wherein said cooperating locking means comprise teeth means on said actuator member and ledge means on said brake lever, said teeth means engaging said ledge means for locking said brake lever in the brake engaged position.

4. The mechanism of claim 3 wherein a plurality of sets of said teeth are provided for locking said lever at different locked positions.

5. The mechanism of claim 1 wherein said actuator member comprises a U-shaped member straddling said hand grip portion and being slidably movable in a direction transverse to the longitudinal direction of said hand grip portion, and said brake lever includes a U-shaped portion straddling said hand grip portion, said pin member receiving both said U-shaped actuator member and said U-shaped portion of said brake lever.

6. A combination parking brake and brake mechanism for a vehicle of the type having a handle bar assembly with a hand grip portion thereon, said mechanism comprising, in combination, a brake assembly operatively mounted on said handle bar, a pin member mounted on said handle bar assembly, said brake assembly including a movable brake lever pivotally carried by said pin member adjacent said hand grip portion, said brake lever being movable between a brake engaged position and a brake disengaged position, means for normally biasing said brake lever to the brake disengaged position, a parking brake actuating member mounted on said handle bar assembly adjacent said hand grip portion, said actuating member being slidably carried by said pin member and being movable between a first position, when said parking brake mechanism is disengaged and a second position when said parking brake mechanism is engaged, means for normally biasing said actuator member to the normally disengaged position for avoiding interference with the normal operation of said brake lever, and cooperating means on said lever and on said actuator member for locking said lever in said brake engaged position, only when said actuator member is in said second position, and while opposing the normal biasing of said actuating member to said disengaged position, and when said lever is in said brake engaged position.

7. The mechanism of claim 6 wherein said cooperating locking means comprises teeth means on said actuator member and ledge means on said lever, said teeth means engaging said ledge means for locking said brake lever in the brake engaged position thereby engaging said parking brake.

8. The mechanism of claim 6 wherein said actuator member comprises a U-shaped member straddling said hand grip portion and being slidably movable in a direction transverse to the longitudinal direction of said hand grip portion, and said brake lever includes a U-shaped portion straddling said hand grip portion, said pin member receiving both said U-shaped actuator member and said U-shaped portion of said brake lever.

9. A parking brake mechanism for a vehicle of the type utilizing a handle bar assembly which includes a hand grip portion, a brake assembly operatively mounted on said handle bar assembly, said brake assembly being of the type which includes a movable lever pivotally carried by said handle bar assembly adjacent said hand grip portion, said lever being movable between a brake engaged position, and a brake disengaged position, said parking brake mechanism, comprising in combination, a U-shaped actuator member mounted on said handle bar assembly adjacent said hand grip portion and straddling said handle bar assembly adjacent said hand grip portion and being slidably movable in a direction transverse to the longitudinal direction of the hand grip portion, said actuator member being movable between a first position, when said parking brake mechanism is disengaged and a second position, when said parking brake is engaged, said brake lever including a U-shaped actuator member, and cooperating means on said lever and on said actuator member for locking said lever in said brake engaged position only when said actuator member is in said second position and when said lever is in said brake engaged position, said cooperating locking means including engaging means on said lever and engaging means on said actuator member, both of said engaging means being movable to said locking relationship for maintaining said brake in the brake engaged position.

10. The mechanism of claim 9 wherein said U-shaped actuator member is normally biased to the disengaged position, and said brake lever member is normally biased to the brake disengaged position.

11. The mechanism of claim 9 including a pin member mounted on said handle bar assembly adjacent said hand grip portion, said brake lever being pivotally carried by said pin and said actuator member being slidably carried by said pin member.

* * * * *